(12) United States Patent
Hillis

(10) Patent No.: US 10,594,554 B2
(45) Date of Patent: Mar. 17, 2020

(54) METHOD AND APPARATUS FOR COMMUNICATION SYSTEM UPGRADE VIA PHASED ADOPTION

(71) Applicant: Applied Invention, LLC, Glendale, CA (US)

(72) Inventor: W. Daniel Hillis, Toluca Lake, CA (US)

(73) Assignee: Applied Invention, LLC, Burbank, CA (US)

( * ) Notice: Subject to any disclaimer, the term of this patent is extended or adjusted under 35 U.S.C. 154(b) by 39 days.

(21) Appl. No.: 14/711,726

(22) Filed: May 13, 2015

(65) Prior Publication Data
US 2015/0333963 A1 Nov. 19, 2015

Related U.S. Application Data

(60) Provisional application No. 61/994,017, filed on May 15, 2014.

(51) Int. Cl.
*H04L 12/24* (2006.01)

(52) U.S. Cl.
CPC ........ *H04L 41/0866* (2013.01); *H04L 41/082* (2013.01); *H04L 41/12* (2013.01); *H04L 41/145* (2013.01); *H04L 41/147* (2013.01)

(58) Field of Classification Search
CPC ... H04L 41/08; H04L 41/0866; H04L 41/082; H04L 41/04; H04L 41/12; H04L 41/145; H04L 41/147; H04L 41/142; H04L 45/22; H04L 45/28
See application file for complete search history.

(56) References Cited

U.S. PATENT DOCUMENTS

| | | | |
|---|---|---|---|
| 8,520,540 B1* | 8/2013 | Foschiano | H04L 43/0852 370/252 |
| 9,178,807 B1* | 11/2015 | Chua | H04L 45/02 |
| 2004/0081079 A1* | 4/2004 | Forest | H03M 13/43 370/216 |
| 2013/0145359 A1* | 6/2013 | Hanselmann | G06F 8/67 717/173 |
| 2013/0148494 A1* | 6/2013 | Abbas | H04L 47/746 370/225 |
| 2014/0160922 A1* | 6/2014 | Shiota | H04L 69/40 370/228 |

* cited by examiner

*Primary Examiner* — Jeffrey M Rutkowski
*Assistant Examiner* — Basil Ma
(74) *Attorney, Agent, or Firm* — Perkins Coie LLP

(57) ABSTRACT

A phased adoption procedure is disclosed for adopting a new communication system that provides potential adopters a high degree of confidence in the reliability of the proposed communication system prior to committed adoption.

23 Claims, 5 Drawing Sheets

METHOD AND APPARATUS FOR COMMUNICATION SYSTEM UPGRADE VIA PHASED ADOPTION

CROSS REFERENCE TO RELATED APPLICATIONS

This application claims priority to U.S. provisional patent application Ser. No. 61/994,017, filed May 15, 2014, which is incorporated herein in its entirety by this reference thereto.

FIELD

The invention relates to computer networking and telecommunications. More particularly, the invention relates to a method and apparatus for communication system upgrade via phased adoption.

BACKGROUND

An essential factor in the deployment of a new communication system is demonstrating the reliability of the system prior to committed adoption. A bootstrapping problem exists, however, in that true reliability can only be demonstrated through the continued use of the communication system. Especially for communication systems that are used by large organizations or entire societies, a "you first" mentality may prevail when deciding if and when to adopt the new communication system. Thus, potential adopters sensibly follow a "wait and see" approach through which they can assess the reliability of the new system by observing the experiences of others.

Numerous error detection and correction techniques exist for determining the fidelity with which particular data frames, data packets, or files have been transmitted through a communication system at particular moments in time. For example, parity bits and checksums can be used in the data link and transport layers of the open systems interconnection model (OSI Model), which is a conceptual model that characterizes and standardizes the internal functions of a communication system by partitioning it into abstraction layers, to ensure that individual packets and data frames of information are accurately relayed from a sender to a receiver. Similarly, cryptographic hash functions, e.g. the MD5 function, are routinely used at the application layer to verify the successful transmission, e.g. the download, of larger data units, e.g. compressed archives or software packages.

Verifying the continuity of this fidelity, however, inherently requires more time. Potential adopters may wish to observe the reliability of the proposed communication system over a substantial period of time in real-world applications and under real-world conditions, i.e. environments that are not easily replicated during experimental testing. For example, a potential adopter may wish to verify the availability, i.e. the proportion of time a system is in a functioning condition, of the system under varying environmental stresses, such as operating temperatures, weather conditions; or the resistance of the system to continued and evolving attacks by adverse parties.

Accordingly, it would be advantageous to provide potential adopters with a method of adoption that nurtures a high degree of confidence in the reliability of the communication system prior to committed adoption.

SUMMARY

Embodiments of the invention provide a phased adoption procedure for adopting a new communication system that provides potential adopters a high degree of confidence in the reliability of the proposed communication system prior to committed adoption.

DRAWINGS

DESCRIPTION

Figure 1A:
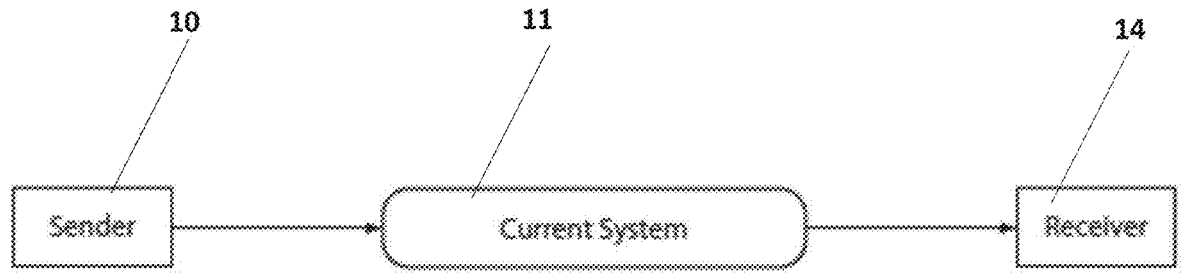
FIGS. 1A-1C show a schematic overview of the phases of switching from a current communication system to a proposed communication system according to the invention.
Figure 1B:
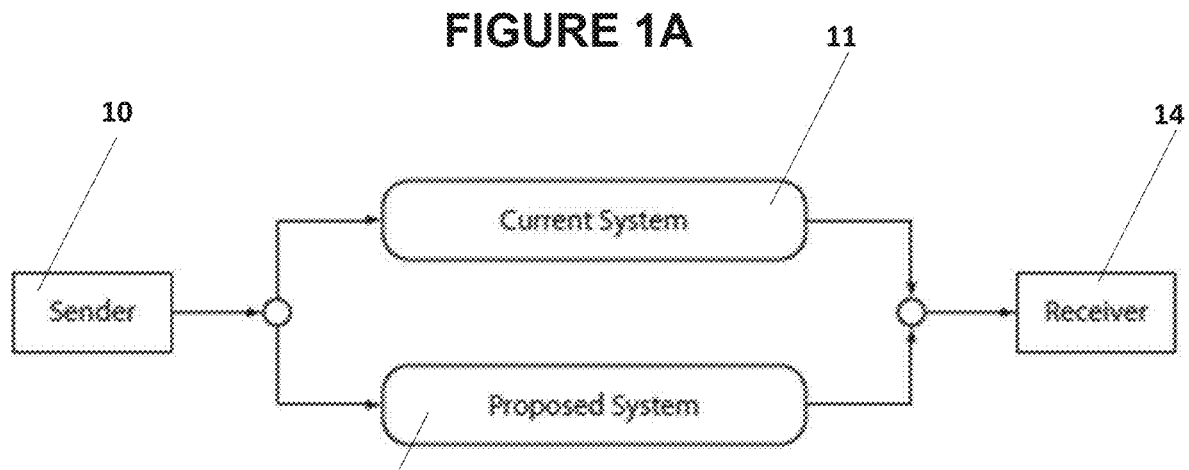
Figure 1C:
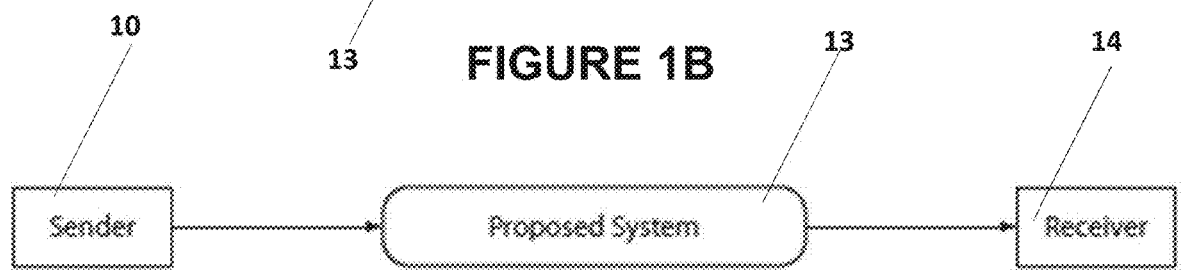

Embodiments of the invention provide a phased adoption procedure for adopting a new communication system that provides potential adopters a high degree of confidence in the reliability of the proposed communication system prior to committed adoption. FIGS. 1A-1C show a schematic overview of the phases of switching from a current communication system to a proposed communication system according to an embodiment of the invention.

The current and proposed communication systems may be based upon circuit switched, message switched, or packet switched networks. For example, the communication system may be a circuit switched telephone network, a packet switched computer network, or the packet switched automotive communication networks described in greater detail below.

In the preferred embodiment of the invention, the current and proposed communication systems are communication protocols. Preferably, the protocols are defined in software. In such embodiments, progressing through the phases described below may be performed via software updates.

In FIG. 1A, prior to proposal of the new communication system, a sender 10 transmits data to a receiver 14 through the current communication system 11.

In the second phase of the adoption procedure, see FIG. 1B, the available communication bandwidth of the underlying communication channel, measured, for example, in circuits, message, or packets per unit time, is split between the current system 11 and the proposed system 13, and the current system and proposed system operate in a parallel or interleaved manner.

In one embodiment of the invention, each portion of data is transmitted through both the current system and the proposed system. Transmission is fully redundant, with each portion of data transmitted via the current system and as test data via the proposed system. This eliminates the possibility of data loss due to a failure in the proposed system alone. Redundant transmission also enables direct comparison of the test data received via the proposed system with the data received via the current system. This provides a supplementary mechanism, in addition to the error correction techniques mentioned above, by which the reliability of the proposed system may be assessed.

Fully redundant data transmission, however, does reduce the effective bandwidth of the combined systems to half that of the underlying communication channel. Thus, in various alternative embodiments of the invention, only a portion of the data transmitted through the current system is transmitted through the proposed system as test data. The fraction of the total data, e.g. 1/10, transmitted through the proposed system as test data and the nature of the test data, e.g. whether it is actual data or meta-data, such as headers, checksums, or cryptographic hashes, transmitted through the proposed system may all be adjusted, either upon establishing the second phase or over time during the second phase, based on the latest estimates of the reliability of the proposed system.

For example, if the latest estimates of the reliability of the proposed system, determined as described below, remain low, only a small fraction of the lowest priority data may be transmitted through the proposed system. While transmitting only a small fraction of the total data through the proposed system does not fully stress the proposed system in terms of bandwidth handled, it does allow for observation of communication system reliability over time in the presence of the environmental and adversarial factors described above.

Additional embodiments of the invention incorporate other techniques for reducing the bandwidth of the test data, that is, the bandwidth that must be dedicated to assessing the reliability of the proposed system. In one such embodiment, only the cryptographic hash, e.g. the MD5 hash, of a data unit, e.g. a packet, transmitted through the current system is transmitted through the proposed system. In another embodiment, only the header of the data unit, e.g. a packet header or frame header, is transmitted through the proposed system.

The reliability of the proposed system can be assessed using one or more of a variety of techniques, depending on the nature of the data transmitted through the proposed system. In those embodiments in which a fraction of the actual data is transmitted through the proposed system, the reliability of the proposed system can be assessed by either or both (1) verifying any error detection techniques, e.g. parity bits, checksums, or cryptographic hashes, accompanying the test data transmitted through the proposed system; and (2) directly comparing the test data transmitted through the proposed system with the equivalent data transmitted through the current system. In those embodiments in which only meta-data, e.g. a header, checksum, or hash, is transmitted through the proposed system, the meta-data can be compared against the result of applying the corresponding error detection technique to the corresponding transmitted through the current system.

After a period of time operating in the second phase, when the proposed communication system has demonstrated sufficient reliability, the third phase of the adoption procedure begins. See FIG. 1C. The sender transmits data to the receiver solely through the proposed system 13 and committed adoption is complete. In effect, the proposed system becomes the current system.

Embodiments of the invention can also be used to test a proposed system in parallel with a current system to expand the capacity of, rather than replace, the current system. In such case, during the second phase the proposed system would still be tested as above. After being proved, the proposed system would 'go live', but instead of replacing the current system it would supplement the capacity of the current system.

For simplicity, FIGS. 1A-1C and 2A-2B show a unidirectional flow of data from a sender to a receiver. In practice, the flow of data is bidirectional, and each potential adopter has the opportunity to evaluate the reliability of the communication system as both sender and receiver.

In one embodiment of the invention, the potential adopters assess the reliability of the proposed system using one or more of the techniques described above and collectively determine, e.g. via voting or reporting the results of the assessments to a regulatory authority, that the proposed system is sufficiently reliable, and all potential adopters can adopt the proposed system in a coordinated fashion.

Alternatively, each potential adopter individually determines, e.g. as sender, receiver, or both, when the proposed communication system has demonstrated sufficient reliability using one or more of the techniques described above. Such adopters communicate as sender and receiver solely through the proposed system, while other potential adopters continue to communicate through both the current and proposed system. Once a sufficient number of potential adopters have individually adopted the proposed system, the remainder of the potential adopters automatically allocate all bandwidth to the proposed system, either by voluntarily agreement or at the prompting of a regulatory authority.

The invention as illustrated in FIGS. 1A-1C is readily generalized to support continuous migration through an indefinitely long sequence of communication system upgrades.

Figure 2A:
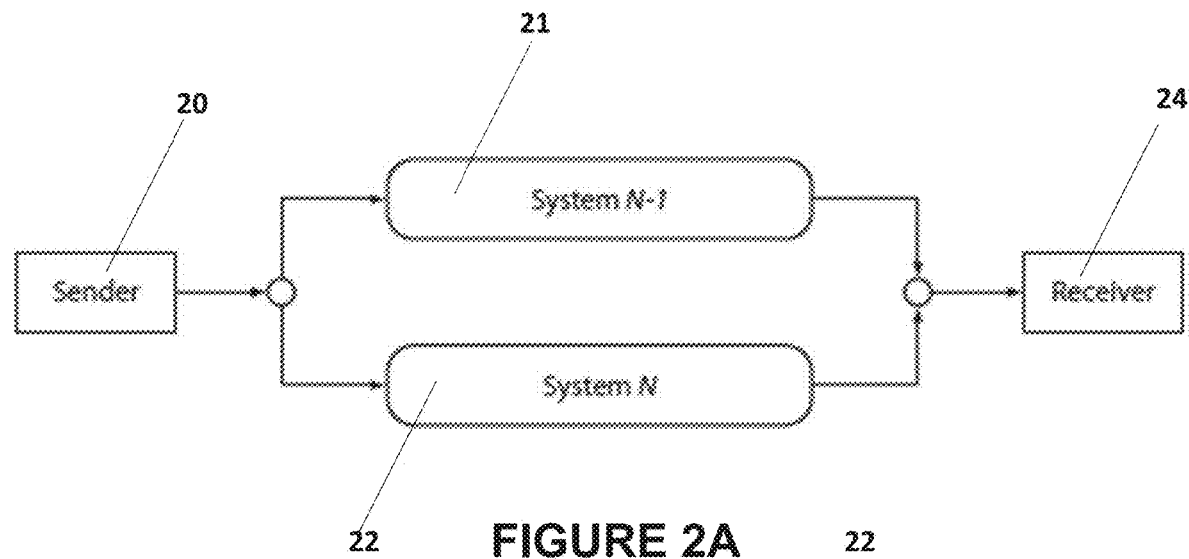
FIGS. 2A and 2B show a schematic overview of the phases of switching through a sequence of communication system generations according to the invention.
Figure 2B:
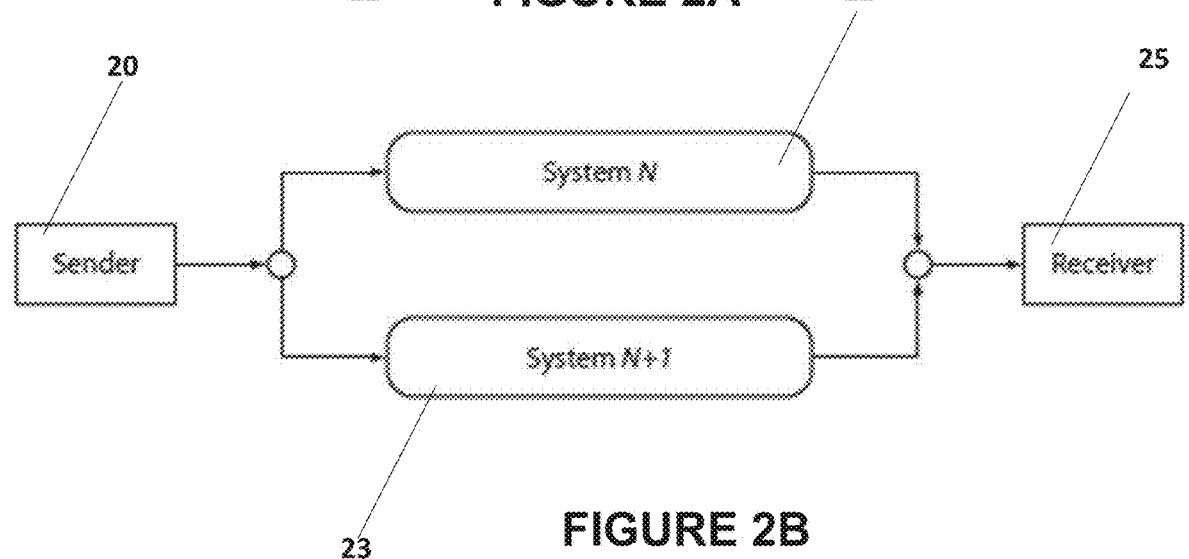

FIGS. 2A and 2B show a schematic overview of the phases of switching through a sequence of communication system generations according to an embodiment of the invention. In this embodiment of the invention, at each phase of the procedure the available communication bandwidth is split between successive generations of the communication system.

In FIG. 2A, at a first moment in time the sender 20 transmits data to the receiver 24 through the current systems 21, e.g. System N−1, and the proposed systems 22, e.g. System N, via a data splitting scheme such as described above.

In FIG. 2B, once the proposed system is accepted for committed adoption the communication systems cycle one generation and the sender again transmits data through the current systems 22, e.g. System N, and the proposed systems 23, e.g. System N+1. In this manner, the reliability of the next-generation communication system is continually under evaluation.

Additionally, embodiments of the invention are readily generalized to allow for the concurrent evaluation of more than one proposed communication system. Specifically, if the Nth system is the current system, an (M+1)-way split of data across the systems {N, N+1, . . . , N+M} allows for the concurrent evaluation of M proposed systems, with proposed systems aging through an evaluation process from most recently proposed to next-in-line for adoption.

Finally, embodiments of the invention can be applied at any one or more levels within the OSI communication system model. The sender and receiver may be any number of hardware or software devices, e.g. switches or routers, or applications depending on the specific layer at which the bandwidth split occurs. In performing the split, the available communication bandwidth is determined by the bandwidth-limiting layer or layers above or below.

Exemplary Usage

To illustrate the operation of embodiments of the invention, consider the case of an automotive communication system in which several communication nodes, each associated with a vehicle device, e.g. a security system or a cruise control unit, are connected to one another at the physical and data link layers. Each node (see FIG. 4, for example) comprises at least one receiving port 101 and buffer, at least one sending port 102 and buffer, and input 111 and output 112 links to the associated vehicle device.

Figure 3:
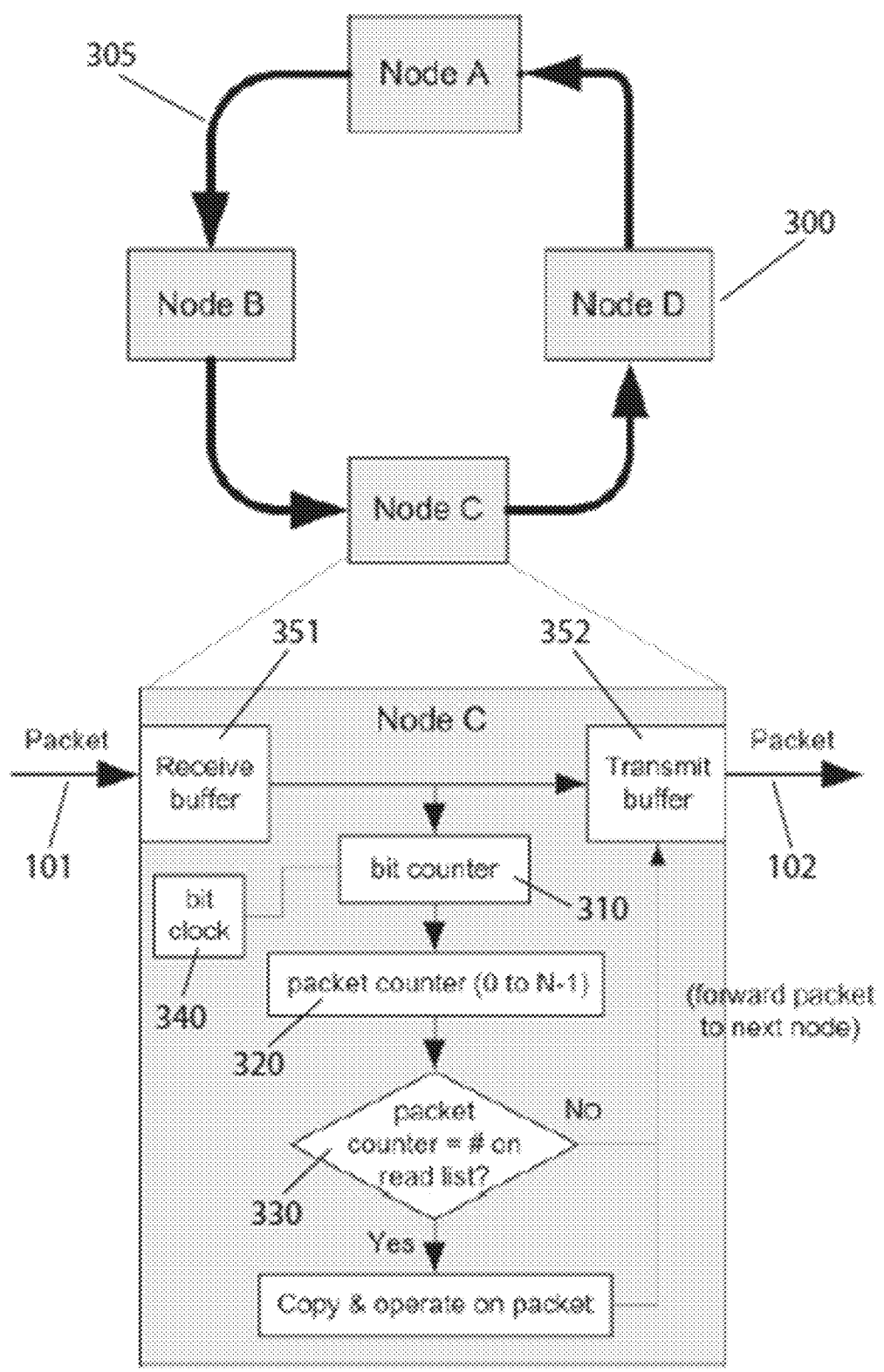
FIG. 3 shows a schematic view of an exemplary addressless, collision free, time-triggered point-to-point ring network according to the invention.

Suppose that in the current system configuration, software or programmable hardware onboard the node, serving as the network and transport layers, configures the nodes into an address-less, collision-free, time-triggered point-to-point ring network. A ring network, described in greater detail below and illustrated in FIG. 3, is a network in which each node connects to exactly two other nodes, yielding a single continuous loop.

Further suppose that an automotive designer wishes to configure the nodes more flexibly into an address-less, collision-free, time-triggered, point-to-point network that is not restricted to a ring topology. Embodiments of the invention allow the designer to implement the proposed network on a prospective basis by installing a new system configuration, i.e. loading new software or re-programming hardware, to implement both the current and proposed network in a parallel or interleaved manner. The designer only needs to commit to the proposed network after its reliability is extensively confirmed, either or both in testing or in the field.

More detailed descriptions of the exemplary networks are provided below. One of the two networks below could be the current system and the other could be the proposed system. In a presently preferred embodiment of the invention, the Point-to-Point-Ring is the current system and the Point-to-Point is the proposed system.

Address-Less, Collision Free, Time-Triggered Point-to-Point Ring Network

Three problems encountered when designing a real-time communication network are the efficient use of bandwidth, collision avoidance, and deterministic messages. Packets of information sent from one communication node to another contain an address so that each node can determine which packets are intended for it. This address is overhead because it uses bandwidth but does not contain useful message information, thus decreasing the efficiency of a real-time network.

When a node receives or tries to send two or more packets at the same time, a collision occurs. Methods to deal with collisions include buffering the packet or choosing a packet and dropping the others, unacceptable in a real-time system.

For a real-time system with control loops to operate correctly, the time when a message is received must be fixed and known by the node receiving the message. This is called a time-triggered network.

FIG. 3 shows an exemplary address-less, collision free, time-triggered point-to-point ring network according to an embodiment of the invention. To provide the time-triggered, collision-free, address-less network with a ring topology 305, the software or programmable hardware within each node implements the following components:

A bit counter 310 which increments as each bit is received, until the counter equals the fixed packet size.

A packet counter 320 which increments when the bit counter indicates a complete packet. When the packet counter equals N−1, where N is equal to the number of nodes in the network, it is reset to 0.

A read list 330 identifying the values of the packet counter at which the node should operate on packets.

A bit clock 340 and a mechanism of synchronizing the bit clock, bit counter, and packet counters.

When the network is initialized, the bit clocks, bit counters, and packet counters are synchronized and the nodes go into operational mode. With packet counters at 0, each node 300 places the packet to be sent, or an empty packet, in its transmit buffer 352, sends it, and increments the packet counter by 1. Each node then transfers the packet in its receive buffer 351 to its transmit buffer until the packet counter equals N−1, when the process is repeated. If the packet counter equals a number on the read list, the packet is intended for that node; the node then creates a local copy of the packet from the receive buffer and performs any operations required. Because the packet counter and read list determines when packets are to be copied, there is no need for addresses.

Because only one packet is being sent and received at the same time, there are no collisions. Each packet is forwarded N−1 times, thus reaching every node in the ring. Because the transmitting and receiving nodes are always a fixed distance apart, a packet always arrives at the same time relative to when the packet counter is 0. The network is therefore deterministic.

It may be an additional requirement that some nodes have more than one packet to send. For each additional packet, additional buffers can be created between the transmit buffer and receive buffer. The packets propagate through the node in a first in, last out manner. When the packet counter is 0, the node loads the send buffer and the additional buffers with all of the packets that must sent in a predetermined order. The node still uses the stored information to determine which packets are intended for it. The preset value for N in all nodes is increased by the total number of additional buffers in all nodes in the network.

Address-Less, Collision-Free, Time-Triggered, Point-to-Point Network

Figure 4:
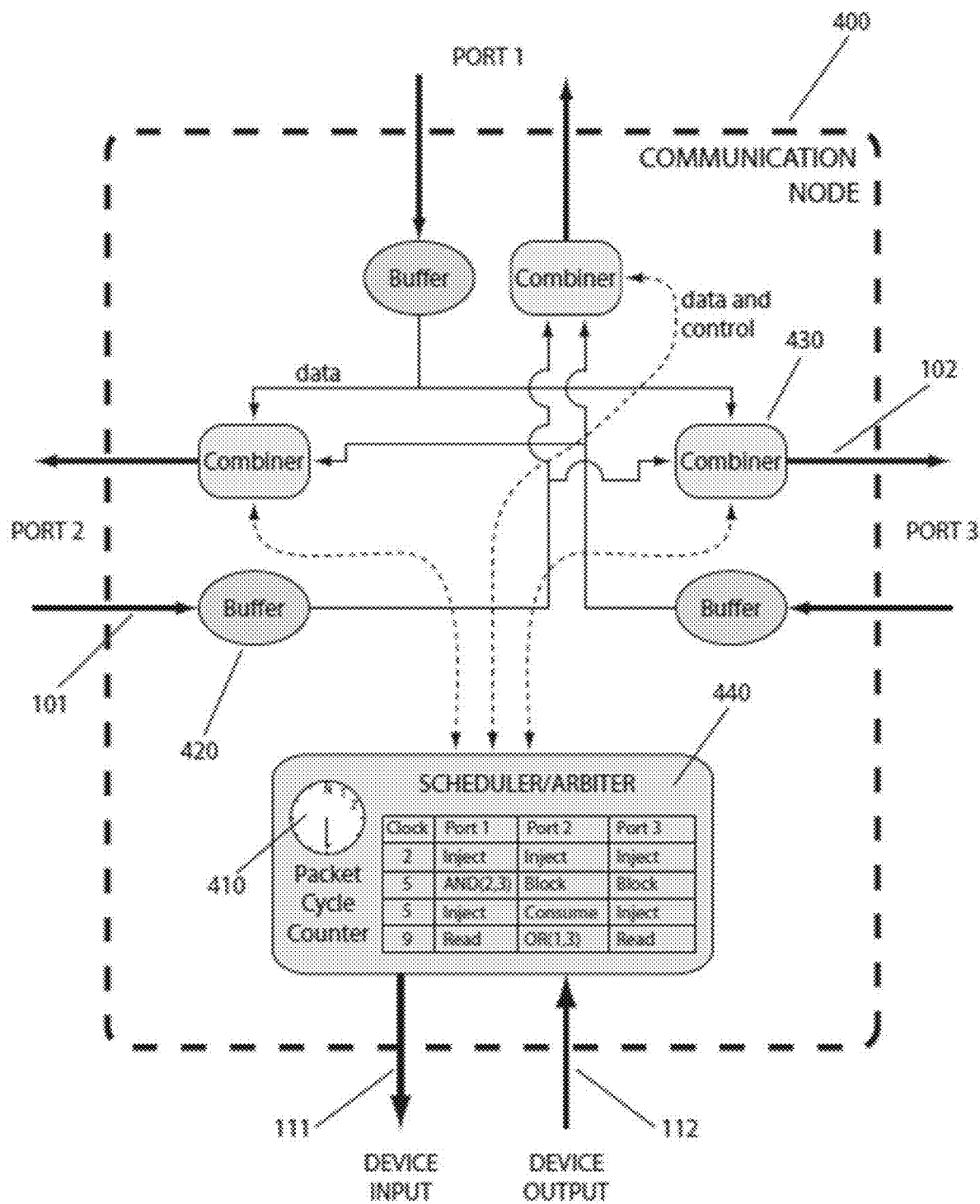
FIG. 4 shows a schematic view of an exemplary addressless, collision free, time-triggered point-to-point network according to the invention.

FIG. 4 shows an exemplary address-less, collision free, time-triggered point-to-point network according to an embodiment of the invention. To provide the time-triggered, collision-free, address-less network of arbitrary topology, the software or programmable hardware within each node implements the following behavior:

Each node 400 on the network sends and receives packets of a fixed size. To serially send the packets, each node has a bit clock. The length of the bit clock is the time it takes to send or receive one bit of the packet. Associated with each communication port are a buffer for storing the packet being transmitted and a buffer for storing the packet being received.

Each node contains a bit counter to count the number of bits for each packet. Each node also contains a modulo N counter called a packet counter 410. When the bit counter reaches the number of bits per packet, it resets itself and increments the packet counter. When the packet counter reaches N it is reset to zero.

The default behavior of each node is to transfer the packet in the receive buffer 420 to each of the transmit buffers, i.e. combiners 430, each time the packet counter is incremented. However, there is stored data in each node used to modify, via a scheduler/arbiter 440, the default behavior.

At design time, the network is analyzed to determine when a particular network node must insert, block, read, or operate upon packets received from adjacent nodes. A schedule is created for each node indicating at what packet counter values a packet should be inserted, read and/or blocked at one or more of the transmit buffers. The stored information may also indicate that a transmit buffer should operate upon, for example a logical AND or logical OR, the data it receives from multiple receive buffers. The design analysis may be iterative to insure there are no collisions and all packets reach the intended nodes. The schedule for each individual node is stored in that node.

The global value N is also computed from this analysis. After the network is initialized, a distributed synchronization method is used to synchronize the bit clock, the bit counter and the packet counters in all nodes. The nodes then go into an operational mode in which the default behavior of each node is to forward any packet it receives. This behavior is modified by the schedule stored in the node. During each packet cycle, the scheduler/arbiter references the stored schedule information to determine if a packet is to be inserted, read or blocked at each of the transmit buffers, or if a transmit buffer should operate upon the data received from the receive buffers. Because all nodes are synchronized and the schedule is predetermined, the network is time triggered, collisions are prevented, and addresses are not required.

Computer Implementation

Figure 5:
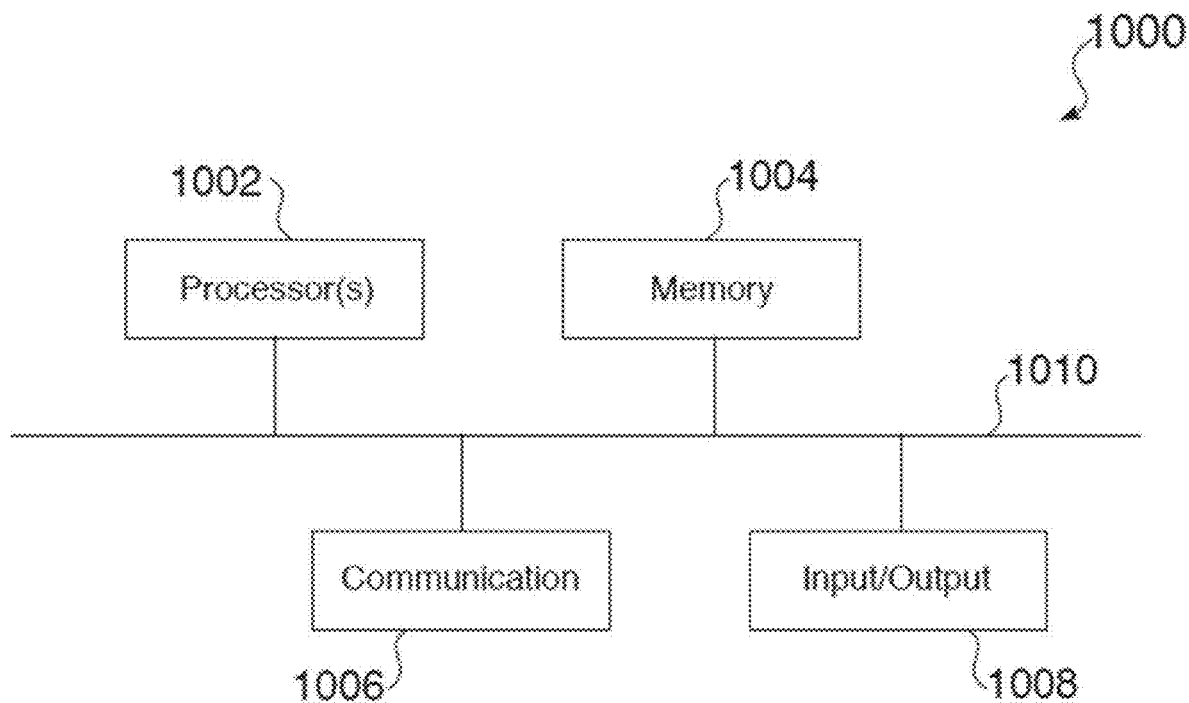
FIG. 5 is a block schematic diagram showing a machine in the example form of a computer system within which a set of instructions for causing the machine to perform one or more of the methodologies discussed herein may be executed.

FIG. 5 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 1000 may include one or more central processing units ("processors") 1002, memory 1004, input/output devices 1008, e.g. keyboard and pointing devices, touch devices, display devices, storage devices, e.g. disk drives, and communication facilities 1006, e.g. network interfaces, that are connected to an interconnect 1010.

In FIG. 5, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a Hyper-Transport or industry standard architecture (ISA) bus, a small computer system interface (SCSI) bus, a universal serial bus (USB), IIC (12C) bus, or an Institute of Electrical and Electronics Engineers (IEEE) standard 1394 bus, also referred to as Firewire.

The memory 1004 and storage devices are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 1004 can be implemented as software and/or firmware to program one or more processors to carry out the actions described above. In some embodiments of the invention, such software or firmware may be initially provided to the processing system 1000 by downloading it from a remote system through the computing system, e.g. via the communication facility.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for phased adoption of a proposed communication system over a single communication channel, wherein the single communication channel has an available communication bandwidth, the method comprising:

during a first phase, a sender transmitting data over the single communication channel to a receiver using a current communication system, wherein all of the available communication bandwidth of the single communication channel is available for use by the current communication system, wherein the sender and the receiver each comprise one or more hardware or software devices or applications;

during a second phase subsequent to the first phase, the sender transmitting data over the single communication channel to the receiver using both the current communication system and the proposed communication system, wherein the proposed communication system is different than the current communication system, and wherein the available communication bandwidth of the single communication channel is split in any of a parallel or interleaved manner between the current communication system and the proposed communication system;

establishing confidence for potential adopters in reliability of the proposed communication system, prior to committed adoption thereof; and during a third phase, after a predetermined period of time operating the proposed communication system, when the proposed communication system has demonstrated sufficient reliability, the sender transmitting data over the single communication channel to the receiver solely using the proposed communication system, wherein all of the available communication bandwidth of the single communication channel is subsequently available for use by the proposed communication system, wherein the current communication system and the proposed communication system are based on any of a circuit switched network, a message switched network, or a packet switched network, and wherein committed adoption is complete and the proposed communication system becomes the current communication system; and wherein the current communication system and the proposed communication system are communication protocols that are each defined in software, and wherein the proposed communication system is provided via a software update.

2. The method of claim 1, wherein during the second phase, each portion of data that is transmitted from the sender to the receiver over the single communication channel using the current communication system is also transmitted from the sender to the receiver over the single communication channel as test data using the proposed communication system.

3. The method of claim 2, further comprising:
making transmission fully redundant during the second phase to eliminate a possibility of data loss due to a failure in the proposed communication system alone.

4. The method of claim 2, further comprising:
during the second phase, making transmission of the data over the single communication channel to the receiver using the current communication system and the proposed communication system fully redundant; and
directly comparing data received by the current communication system with data received by the proposed communication system to assess the reliability of the proposed communication system.

5. The method of claim 1, further comprising:
during the second phase:
transmitting each portion of data through either the current communication system or the proposed communication system over the single communication channel;
estimating the reliability of the proposed communication system; and
adjusting any of a fraction of the total data transmitted through the proposed communication system and the nature of the data transmitted through the proposed communication system based on the estimated reliability.

6. The method of claim 5, further comprising:
during the second phase, transmitting only a small fraction of the lowest priority data through the proposed communication system when the reliability of the proposed communication system is low.

7. The method of claim 5, further comprising:
during the second phase, reducing bandwidth that is dedicated to assessing the reliability of the proposed communication system.

8. The method of claim 5, further comprising:
during the second phase, only transmitting through the proposed communication system a header of a data unit that is transmitted through the current communication system.

9. The method of claim 1, wherein a flow of data is bidirectional, and further comprising:
providing each potential adopter with an opportunity to evaluate the reliability of the proposed communication system as both sender and receiver.

10. The method of claim 1, further comprising:
potential adopters collectively determining via voting or another distributed decision making method that the proposed communication system is sufficiently reliable; and
all potential adopters adopting the proposed communication system in a coordinated fashion.

11. The method of claim 1, further comprising:
at least one potential adopter communicating as sender and receiver solely through the proposed communication system, while other potential adopters continue to communicate through both the current communication system and the proposed communication system;
the at least one potential adopter individually determining as a sender, a receiver, or both, when the proposed communication system has demonstrated sufficient reliability; and
when a sufficient number of potential adopters have individually adopted the proposed communication system, a remainder of the potential adopters automatically allocating all of the available communication bandwidth to the proposed communication system, either by voluntary agreement or at a prompting of a regulatory authority.

12. The method of claim 1, further comprising:
supporting continuous migration through an indefinitely long sequence of communication system upgrades.

13. The method of claim 1, further comprising:
splitting the available communication bandwidth of the single communication channel between successive generations of a communication system.

14. The method of claim 1, further comprising:
a sender transmitting data to a receiver through the current communication system and the proposed communication system over the single communication channel via a data splitting scheme; and
once the proposed communication system is accepted for committed adoption, cycling the communication system one generation and the sender transmitting data through a now current communication system and a next-generation proposed communication system;
wherein reliability of each next-generation communication system is continually under evaluation.

15. The method of claim 1, further comprising:
concurrently evaluating more than one proposed communication system, in which an Nth communication system is the current communication system; and
performing an (M+1)-way split of the available communication bandwidth of the single communication channel across the communication systems {N, N+1, ..., N+M} to allow for concurrent evaluation of M proposed communication systems, with proposed communication systems aging through an evaluation process from most recently proposed to next-in-line for adoption.

16. The method of claim 1, further comprising:
performing the split of the available communication bandwidth of the single communication channel between the current communication system and the proposed communication system at any one or more layers within an OSI communication system model, wherein the sender and the receiver utilize a specific layer at which the bandwidth split occurs; and
determining the available communication bandwidth of the single communication channel when performing the split of the available communication bandwidth of the single communication channel based on a bandwidth-limiting layer or layers above or below.

17. The method of claim 1, further comprising:
performing the split of the available communication bandwidth of the single communication channel between the current communication system and the proposed communication system in a communication system in which several communication nodes are connected to one another at physical and data link layers;
software or programmable hardware onboard each node, serving as network and transport layers in the current communication system to configure the nodes into an address-less, collision-free, time-triggered point-to-point ring network; and
the proposed communication system configuring the nodes into an address-less, collision-free, time-triggered, point-to-point network that is not restricted to a ring topology by installing a new system configuration to implement both the current communication system and the proposed communication system in any of the parallel or interleaved manner.

18. The method of claim 1, wherein the establishing confidence for potential adopters in the reliability of the proposed communication system is performed in a presence of any of an environmental factor or an adversarial factor, prior to the committed adoption thereof.

19. The method of claim 1, wherein establishing confidence for potential adopters in the reliability of the proposed communication system includes determining the reliability of the software of the communication protocol corresponding to the proposed communication system.

20. The method of claim 5, further comprising:
only transmitting through the proposed communication system a cryptographic hash of a data unit that is transmitted through the current communication system.

21. A method for phased adoption of a proposed communication system over a single communication channel, wherein the single communication channel has an available communication bandwidth, the method comprising:
during a first phase, transmitting data over the single communication channel from a sender to a receiver solely through a current communication system, wherein all of the available communication bandwidth of the single communication channel is available for use by the current communication system, wherein the sender and the receiver each comprise one or more hardware or software devices or applications;
during a second phase:
splitting available communication bandwidth of the single communication channel, including:
transmitting data over a first portion of the available communication bandwidth of the single communication channel through the current communication system, and
transmitting test data over a second portion of the available communication bandwidth of the single communication channel through the proposed communication system for each portion of data transmitted over the first portion of the available communication bandwidth of the single communication channel through the current communication system, wherein the proposed communication system is different than the current communication system;
verifying any of the arrival and the contents of the test data to assess the reliability of the proposed communication system for a predetermined period of time in a presence of an environmental factor; and
during a third phase, transmitting data over the single communication channel only via the proposed communication system,
wherein all of the available communication bandwidth of the single communication channel is subsequently available for use by the proposed communication system,
wherein the current communication system and the proposed communication system are based on any of a circuit switched network, a message switched network, or a packet switched network, and
wherein the adoption is complete and the proposed communication system becomes the current communication system; and
wherein the current communication system and the proposed communication system are communication protocols that are each defined in software, and wherein the proposed communication system is provided via a software update.

22. The method of claim 21, wherein the verifying of the arrival or the contents of the test data to assess the reliability of the proposed communication system for the predetermined period of time is performed in a presence of any of an environmental factor or an adversarial factor.

23. The method of claim 21, wherein establishing confidence for potential adopters in the reliability of the proposed communication system includes determining the reliability of the software of the communication protocol corresponding to the proposed communication system.

* * * * *